July 5, 1949.    B. M. HARRISON    2,474,976

CLAMPING DEVICE FOR VACUUM TUBE APPARATUS

Filed Dec. 28, 1944

INVENTOR.
BERTRAM M. HARRISON
BY
HIS ATTORNEY

Patented July 5, 1949

2,474,976

UNITED STATES PATENT OFFICE 2,474,976

CLAMPING DEVICE FOR VACUUM TUBE APPARATUS

Bertram M. Harrison, Wellesley Hills, Mass., assignor, by mesne assignments, to Submarine Signal Company, Boston, Mass., a corporation of Delaware Application December 28, 1944, Serial No. 570,502

3 Claims. (Cl. 248—361)

1

The present invention relates to vacuum tube apparatus, and, more particularly, to a locking device for locking vacuum tubes into their sockets.

It has frequently been observed that vacuum tubes installed in radio or other equipment which has to be transported or which is used in a place where there is considerable vibration may finally work themselves out of the sockets into which they are fitted. According to the present invention a simple but efficient means is provided for releasably locking a vacuum tube in its socket.

Figure 1:
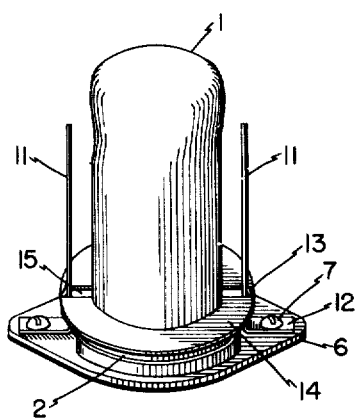
Figure 3:
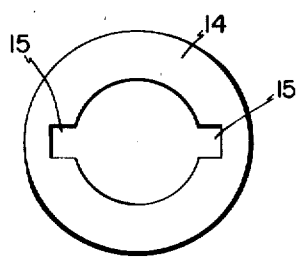
Figures 4, 5:
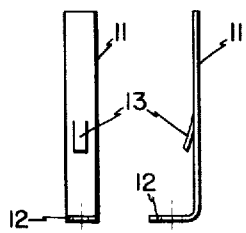

My invention will best be understood from a consideration of the following description taken in connection with the accompanying drawing in which Fig. 1 is a perspective view of my invention completely assembled with a vacuum tube and socket; Fig. 1 shows in partial section an elevation of my invention together with a vacuum tube and socket, with the vacuum tube partly in place; Fig. 3 is a plan view of one element of my invention; Fig. 4 is a front elevation of another element of the invention; and Fig. 5 is a side elevation of the element shown in Fig. 4.

Figure 2:
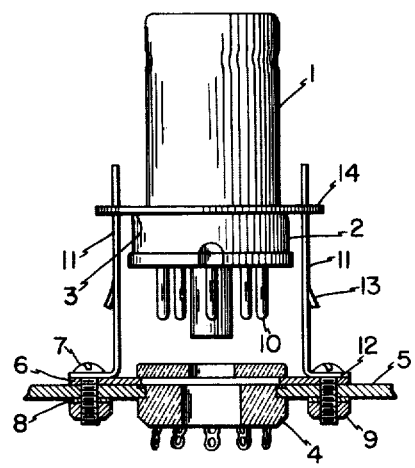

As is well known, vacuum tubes are made in various shapes. I have used as an illustration for my invention its application to a so-called metal tube. As best seen in the elevation in Fig. 2, the tube 1 has a substantially cylindrical upper portion and a lower base portion 2 of somewhat larger diameter, providing a shoulder 3. The tube is customarily fitted into a socket 4 which is usually inserted in an aperture in a metallic chassis plate 5. The socket is held in the chassis 5 by means of a plate 6, screws 7, washer 8 and nut 9. The vacuum tube is customarily held in the socket by friction only, exerted against the prongs 10 by connecting members in the socket and which engage these prongs.

Now in order to provide a positive means for locking the vacuum tube in place I secure two elongated members 11 to the vacuum tube socket in any suitable manner, as, for example, that shown in the drawing which utilizes the same screws 7 which hold the vacuum tube socket in the chassis. To this end the members 11 are bent at right angles to form a foot 12 having an aperture therein through which screw 7 may pass. The members 11 are each also provided with a projection 13 which may conveniently be pressed out of the member 11 in the form of a tongue as shown. Preferably two of these members 11 are used, one positioned on each side of the vacuum tube.

I further provide a ring member 14 which has a central aperture adapted to slip over the upper

2 portion of the vacuum tube 1 and to abut the shoulder 3 of the vacuum tube base. Slots 15 may be cut into the ring as shown in Fig. 3. These slots preferably have a width equal to that of the elongated members 11 so that the ring 14 will pass freely over them. The depth of the slots 15 is such that the ring will pass over the members 11, when the latter are in their normal positions, until the projections 13 are reached. The latter project from the members 11 only far enough so that when the two members 11 are pressed together as far as possible, the vacuum tube being in place, the slots 15 in the ring 14 will just clear the projections 13 and drop below them. The height of the projections 13 above the foot positions 12 is such that when the ring is in its lowest position abutting the shoulder 3 of the vacuum tube, it will be just below the projections 13. Therefore when the members 11 are released and return to their normal positions, the ring 14 and thereby the vacuum tube will be securely locked in place, as shown in Fig. 1. To remove the vacuum tube it is then only necessary to press the two members 11 together, to remove the ring 14 and then to remove the vacuum tube in the usual manner.

The members 11 should be made of a material sufficiently resilient to withstand the required bending when the ring 14 is being put on or taken off.

While I have shown two members 11, one on each side of the vacuum tube, and prefer to use two such members for greater security, it may be sufficient for some purposes to use only one elongated member 11 and to fit the ring 14 closely around the vacuum tube.

Another modification which may be made without departing from the spirit of the invention is that the members 11 may have their projections 13 turned inwardly instead of outwardly as shown and may be spaced far enough apart to engage the outer circumference of the ring 14. In this case the members 11 will be spread apart whenever the ring 14 is to be locked in place or removed.

While I have illustrated my invention as applied to a metal type of vacuum tube, it is obvious that it may be applied to any vacuum tube which has a lower portion of larger diameter than its upper portion, by making the internal diameter of the ring such that it will bear against the enlarged portion of the tube.

Having now described my invention, what I claim is:

1. A locking device for a vacuum tube or the like comprising a plurality of elongated resilient members adapted to be secured to a socket for said tube, ring means adapted to fit closely over said tube and to abut a shoulder on said tube, said ring having slots therein adapted to include said members, and said members having projections extending therefrom adapted to engage an edge of the slots in said ring when said tube is in its socket and said ring is abutting said shoulder and to release said ring when said members are tensioned away from said ring.

2. A locking device for a vacuum tube having a pronged end adapted to fit into a socket and being larger in diameter at the pronged end than in other sections of the tube further away therefrom comprising laterally deformable spring latching members mounted on the socket adjacent the tube and extending in the direction of the surface thereof, a ring member having its inner ring diameter large enough to fit over the end of the tube but not over said larger diameter against which said ring may rest, said latching members engaging the ring on its inner side and exerting lateral spring force against the ring whereby when said ring is brought against said larger diameter of the tube, the latches of the latching members will operate to clamp said tube to the socket.

3. A locking device for a vacuum tube having a pronged end adapted to fit into a socket and being larger in diameter at the pronged end than in other sections of the tube further away therefrom comprising spring latching members mounted on the socket adjacent the tube and extending in the direction of the surface thereof, a ring member having its inner ring diameter large enough to fit over the end of the tube but not over said larger diameter against which said ring may rest, said latching members engaging the ring on its inner side and exerting their spring force against the ring whereby when said ring is brought against said larger diameter of the tube, the latches of the latching members will operate to clamp said tube to the socket, said latching members having sufficient length beyond the latches whereby they may be grasped manually to release the ring for removal of the tube.

BERTRAM M. HARRISON.

REFERENCES CITED

The following references are of record in the file of this patent:

UNITED STATES PATENTS

| Number | Name | Date |
|---|---|---|
| 2,072,939 | Betts | Mar. 9, 1937 |
| 2,382,428 | Leuvelink | Aug. 14, 1945 |

FOREIGN PATENTS

| Number | Country | Date |
|---|---|---|
| 118,454 | Great Britain | Apr. 26, 1944 |
| 299,776 | Germany | Sept. 29, 1919 |
| 625,392 | France | Aug. 6, 1927 |